Jan. 23, 1968  M. J. FOSTER  3,364,739
SPEED AND DISTANCE MEASURING APPARATUS
Filed Aug. 12, 1965
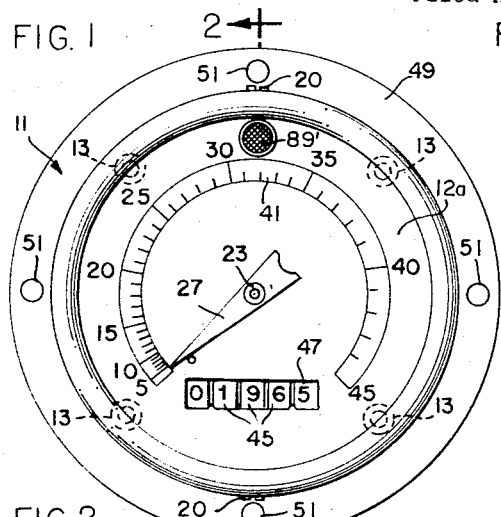
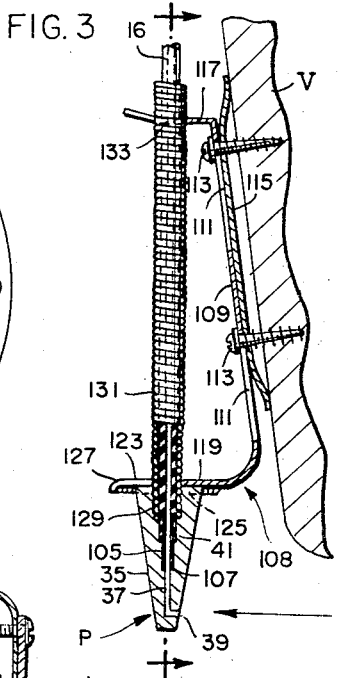
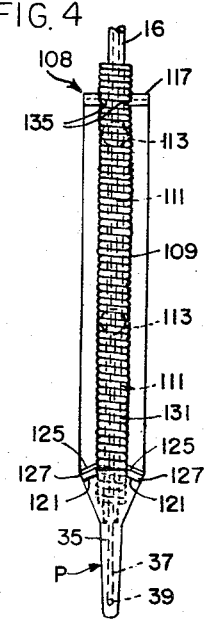
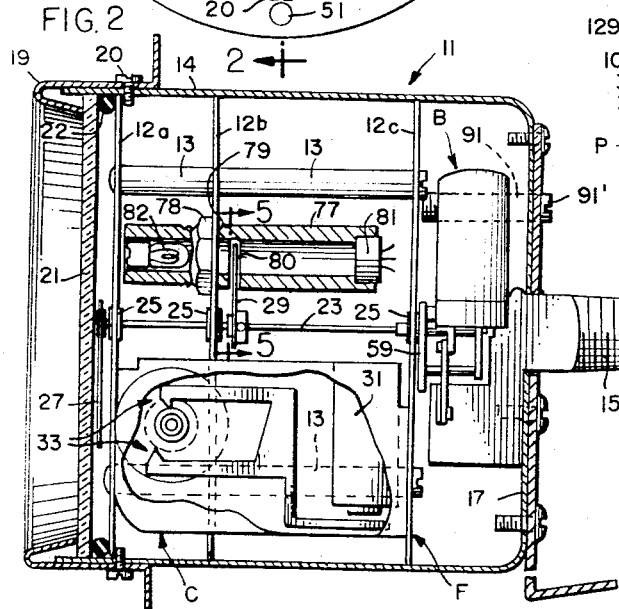
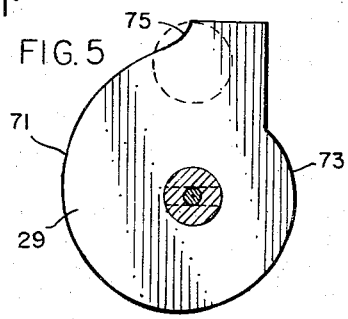
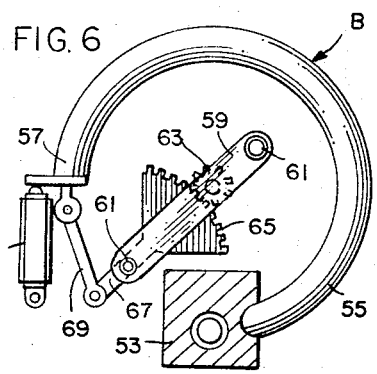
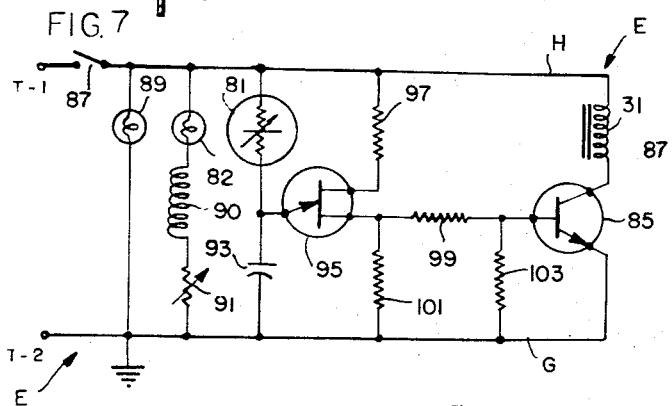
INVENTOR:
MERRILL J. FOSTER
BY
Marzall, Johnston, Cook & Root
ATT'YS

United States Patent Office 3,364,739
Patented Jan. 23, 1968

3,364,739
SPEED AND DISTANCE MEASURING
APPARATUS
Merrill J. Foster, Fox River Grove, Ill., assignor to Marine
Industries, Inc., Barrington, Ill., a corporation of Illinois
Filed Aug. 12, 1965, Ser. No. 479,185
8 Claims. (Cl. 73—183)

ABSTRACT OF THE DISCLOSURE

An instrument for determining and indicating speed and distance traveled by a vessel, such as a boat, in a fluid medium, such as water, comprising a housing, adapted for mounting on an instrument panel and containing a relatively rotatable dial and pointer graduated to indicate distance and driven by a Bourdon tube mounted within the housing and connected with a vessel mounted Pitot tube disposed in the vessel supporting fluid to develop pressure proportional to speed of vessel move-in the medium, the housing also containing a photoconductive cell, a constant intensity light source and an intermediate shutter driven by the Bourdon tube to vary the intensity of cell impinging light and hence the resistance of the cell, as a function of vessel speed in the fluid medium, an electronic counting system, including a timing capacitor and a unijunction transistor connected to actuate a mechanical counter at a frequency corresponding with vessel speed as measured by the varying resistance of the cell, the counter having indicia wheels exposed through an opening in the dial, to indicate distance traveled by the vessel in its supporting medium.

The present invention relates in general to the measurement of speed and the distance traveled by a vehicle in motion in a fluid medium, the invention having more particular reference to an improved speedometer and mileage measuring apparatus for use in boats and aircraft.

An important object of the present invention is to provide a speed and distance measuring instrument for determining and indicating speed and distance traveled by fluid born vehicles such as boats, ships and aircraft; a further object being to provide an instrument comprising a unit adapted for quick and easy mounting in the craft on which it is to be used, which unit will faithfully record distance traveled in air or water even under adverse conditions of temperature, humidity, shock, vibration and turbulence; yet another object being to provide an instrument of the character mentioned that is fully automatic, thoroughly reliable, unusually compact and adapted for economic manufacture.

Another important object of the invention is to provide apparatus embodying a Pitot tube mounted in position extending in the fluid vehicle carrying medium, and a pressure measuring device, such as a Bourdon tube, upon which pressures developed by the Pitot tube, in response to vehicle movement in the supporting fluid medium, are applied in order to indicate speed of travel in terms of Bourdon tube movement; a further object being to provide a transducer in association with the Bourdon tube and with electronic circuitry for integrating speed and time in terms of electrical pulsations, said circuitry serving to apply such pulsations for the actuation of counting mechanism for the indication of distance traveled.

Another important object is to provide an improved foul proof Pitot tube mounting for water born vessels; a further object being to provide a novel spring urged Pitot tube mounting normally supporting the Pitot tube in operative position and yielding to permit the Pitot tube to swing aside upon encountering an obstruction and then to return to operative position after passing the obstruction.

The foregoing and numerous other important objects, advantages and inherent functions of the invention will become apparent as the same is more fully understood from the following description which, taken in conjunction with the accompanying drawings, discloses a preferred embodiment of the invention.

Referring to the drawings:

FIG. 1 is a front view of an indicating instrument embodying the present invention;

FIG. 2 is a sectional view taken through the instrument substantially along the line 2—2, in FIG. 1;

FIG. 3 is a diagrammatic view showing a form of Pitot tube employed to actuate the instrument shown in FIGS. 1 and 2;

FIG. 4 is a sectional view taken substantially along the line 4—4, in FIG. 3;

FIGS. 5 and 6 are plan views of components of the unit shown in FIGS. 1 and 2; and FIG. 7 is a diagram of electrical components and circuitry forming a part of the instrument.

To illustrate the invention the drawings show apparatus 11 for measuring speed and distance traveled by fluid borne vehicles, such as aircraft and boats. The apparatus applied the pressure, developed in a Pitot tube P exposed to the fluid medium in which the vehicle moves, to actuate a Bourdon tube mechanism B, including a dial D calibrated to indicate speed of movement of the vehicle through the medium in which it is carried. The apparatus also includes an electronic system E for integrating the so measured speed with respect to time and for driving a conventional counter mechanism C calibrated to indicate distance traveled in the fluid medium in which the vehicle is moving.

To these ends, the measuring and indicating apparatus may be mounted on a frame F embodying front, medial and back panels 12a, 12b and 12c supported in spaced parallel relation as by means of spacing members 13, and a housing 14 in and on which the frame an apparatus are enclosed and supported. The Bourdon tube mechanism B may have a connection nipple 15 for connecting the mechanism with the Pitot tube P, through a suitable pressure conduit 16. The Bourdon tube mechanism may also be supported on and behind the back panel 12c, within the housing 14. The housing 14 may comprise a preferably cylindrical, formed sheet metal shell open at one end, and closed at the other by a preferably integral wall 17, the housing being sized to snugly receive the peripheries of the panels 12a, 12b and 12c therein, to aid in retaining the structure in the housing, as by suitable fastening and retaining means, such as a bezel 19 secured to the housing, as by means of screws 20, said bezel retaining a transparent window pane 21 in front of the front panel 12a, and O-ring 22 forming a spacing and sealing gasket being disposed between the marginal edges of the pane 21 and panel 13a, within the open end of the housing. The Bourdon tube mechanism B may include a shaft 23 extending through and journaled in preferably nylon or Teflon bushings 25 secured in the frame plates, the shaft carrying a pointer 27 and a disc 29 respectively in position outwardly of the front plate 12a and immediately behind the medial plate 12b. The components of the electronic system E may also be supported in any suitable, preferred or convenient manner upon the frame panels, preferably the medial panel 12b, said medial panel being cut away to accommodate the counter mechanism C, which may extend between and be secured to the front and back panels 12a and 12c. The panels 12a and 12c may thus support the mechanism C, as well as a counter actuating solenoid 31 adapted to drive the counter mechanism through ratchet means 33 adapted to advance the counter mechanism each time the solenoid is energized.

The Pitot tube P is a well known device for measuring the velocity of fluid passing the tube in a direction facing into its open end. As shown in FIG. 3 of the drawings, the tube may be mounted in any convenient location, on a fluid borne vehicle, in position extending in the fluid medium in which the vehicle is adapted to move. While FIGS. 3 and 4 of the drawings illustrate a form of Pitot tube particularly adapted for use in water, the same being shown in mounted position, as at the stern of a waterborne boat or vessel V, it should be understood that, when the invention is applied for airborne use, the same will be used in conjunction with conventional Pitot tube structures designed for use in air. As shown in FIG. 3, however, the Pitot tube P may comprise a thin plate or blade 35 adapted to be secured upon the hull of the vessel V with its lower end depending in position to receive the impingement of water upon the leading edge of the blade when the boat is in motion, the blade being formed with a channel or duct 37 having an end 39 opening upon the forward edge of the blade at or near its lower end, and opening at the top of the blade in position for connection with the pressure conduit 16 which extends to and is connected with the connection nipple 15 of the pressure measuring device B. The conduit 16 may comprise a length of flexible plastic hose and, as shown, may be press fitted, at one end, in a socket 41 at the top of the blade 35, in communication with the duct 37.

The velocity of fluid passing the blade 35, which is the same as the speed of the vessel V in its carrying fluid, is measured by the Pitot tube in terms of the dynamic fluid pressure applied upon the tube. This pressure applied through the pipe or conduit 16 upon the Bourdon tube device B is measured in terms of movement of the shaft 23, from a zero position, as a function of pressure applied on the pressure measuring device, which in turn is a function of speed. Shaft movement may be shown by the pointer 27 on a graduated indicating scale 41 which may be applied to the panel 12a, behind the pointer, and graduated to show speed in any desired units, such as miles per hour, or knots.

The counter mechanism C may comprise conventional digit or numeral wheels 45 forming an odometer; and the mechanism is mounted in position presenting the wheels to view immediately behind and opposite a window opening 47 in the panel 12a. The housing 14 may also be provided with a peripheral flange 49 formed with spaced apart openings 51 therethrough to facilitate the mounting of the unit 11 in viewable position, as in an opening in the usual instrument panel of the craft in which the unit may be mounted for service.

The pressure measuring apparatus B, as shown more particularly in FIG. 6 of the drawings, may comprise a pressure chamber 53 mounted on and within the housing 14 and connected with the Pitot tube P through the nipple 15 and conduit 16. The pressure measuring apparatus also comprises a curved Bourdon tube 55 having a closed end 57 and an open end connected with the pressure chamber 53. As shown, the tube 55 has circular curvature and subtends about 270° or three-quarters of a circle. As pressure increases in the chamber 53, the tube tends to straighten, that is to increase its radius of curvature, which causes its closed end to move away from its opposite end, which is supported on the pressure chamber 53 and thus mounted in the case 14. The displacement of the closed end of the tube away from its open end is a function of pressure prevailing in the chamber 53.

The movement of the closed end 57 of the Bourdon tube, as pressure increases in the chamber 53, is applied to correspondingly turn the shaft 23 and the shaft supported pointer 27 and disc 29, to thereby visually indicate speed by means of the pointer 27 and scale 41, when viewed through the window pane 21. The shaft 23, of course, is suitably journaled in the panel 12c, and may also extend through a bracket bar 59 fastened on and spaced outwardly of the panel, as by means of mounting pins 61 disposed at opposite ends of the bar 59. The shaft 23 may carry a driving pinion 63 fixed thereon adjacent the bracket bar 59. The pinion 63, as shown, may be drivingly connected with a gear segment 65 rockably supported on one of the pins 61, the segment having an actuating arm 67 drivingly connected with the closed end 57 of the Bourdon tube, as by means of a link 69. As a consequence, movement of the tube end 57 will cause the gear segment to turn on the pin 61 and drive the pinion 63 to rotate the shaft 23, thereby turning the pointer 27 to indicate speed on the dial 41 and at the same time also turning the disc 29 in unison with the pointer, so that the disc 29 is also displaced from a zero or datum position as a function of speed.

The present invention contemplates the provision of means operable in conjunction with the disc 29 for integrating speed with time, in order to determine and indicate the distance traveled by the instrument carrying vehicle through its supporting fluid medium. To this end, as shown more particularly in FIG. 5 of the drawings, the disc 29 may be provided with a spirally curved edge 71, extending around the shaft and subtending an angle of the order of 270°, that is to say, approximately ¾ of a circle, from maximum to minimum radius, the radius of the edge progressively increasing from its minimal radius end 73 toward its opposite end 75 of maximum radius. The medial frame panel 12b has an opening formed therein vertically above the shaft 23, a sleeve 77 extending through and being secured in said opening, as by the clamping action of a nut 78 threaded on the sleeve, on one side of the panel 12b, and a peripheral shoulder 79 formed on the sleeve in position to engage the opposite or nut remote side of the panel. Outwardly of the shoulder 79, on the nut remote side of the panel 12b, the sleeve 77 may be formed with a transverse slot 80 in position to receive the disc 29 in position to close the sleeve between its opposite ends, when the disc portions 75 of maximum radius extend in the sleeve, and to progressively open or unblock the sleeve as the disc 29 is turned in the slot, the disc being entirely withdrawn from the sleeve when its portions 73 of minimum radius face into the slot 80. A photoconductive cell 81 and a suitable source of light, such as a small lamp 82, may be mounted within the opposite ends of the sleeve 77 in position to direct a light beam toward the cell 81, under the control of the disc 29, the sleeve 77 serving to confine the beam and to concentrate the same upon the cell 81. When the disc 29 is in its normal, datum, or zero speed position, incidence of the light beam upon the cell will be prevented by the intervening imperforate portion 75 of the disc 29. However, as the disc 29 is progressively turned from its datum position, as the result of relative movement of the vehicle in which the instrument is mounted, through its carrying medium, progressively greater amounts of light will be applied to the photoconductive cell, as disc portions of progressively lesser radius are presented in the slot 80. The disc 29, in conjunction with the sleeve 77, thus forms a screen providing an opening or slot of progressively varying width, between the light source 82 and the photocell 81, whereby the slot area varies continuously and at all times as a proportional function of speed of movement in the fluid medium. As a consequence, the electrical resistance of the photoconductive cell will become progressively changed as a function of the speed of the vehicle in its carrying medium.

The marginal configuration of the disc 29 is determined by the requirement that the amount of light transmitted to the photocell must correspond with the basic speed-pressure formula, that is to say, the pressure developed by the Pitot tube, as the craft moves in its sustaining medium, is proportional to the square of the speed of the craft in the medium. The resistance of the photoconductive cell 81 is inversely proportional to the amount of light incident thereon, and, in order that the resistance of the cell may be held proportional to speed, it must at all times remain proportional to the reciprocal of the square root of pressure generated in the Pitot tube. Accordingly, the edge 71 of the disc is shaped to pass light through the sleeve 77 in amounts corresponding with such reciprocal value.

In order to integrate speed with time and to control the actuation of the distance indicating counter C in accordance therewith, the electronic circuitry E may comprise a pulse generator connected to energize the counter driving solenoid 31, the circuitry, as shown, comprising a transistor 85 having its emitter and collector connected in series with the solenoid coil 31 between a pair of line conductors G and H connected with a suitable source of electric power, as at terminals T–1 and T–2, a circuit controlling switch 87 being connected in the line conductor H adjacent the terminal T–1. The switch 87 preferably comprises a normally closed microswitch mounted in position to be engaged and held open by the closed end 57 of the Bourdon tube 55 when and so long as the same occupies its normal, datum or zero speed position, the switch being released for switch closing movement as soon as the closed end of the Bourdon tube moves away from its normal or zero speed position, in response to the development of pressure in the Pitot tube P. As a consequence, the circuitry E will automatically become conditioned for operation as soon as the instrument carrying vessel V starts to move in its supporting fluid medium.

In addition to the solenoid coil 31 and the transistor 85, the circuitry E may include a tell-tale lamp 89 interconnected between the conductors G and H and disposed in the housing 14 behind a bullseye lens 89' mounted in the front panel 12a to indicate when the switch 87 is in closed position thereby showing that the electronic system E is in operation. The lamp 82 also is interconnected between the conductors G and H, in series with a compensator 90 and an adjustable resistor 91, which may conveniently be mounted within the housing 14 on its rear end wall 17, with a turnable adjusting screw 91' exposed outwardly of the wall.

The compensator 90 may comprise 12 turns of No. 40 fiber glass covered resistance wire, such as Nichrome wire for example, wrapped about a one-quarter inch diameter brass rod which may be threaded for attachment on the panel 12b. The brass rod supports the wire and forms a heat sink. The wire of the compensator has a resistance of the order of fifty ohms, which increases with temperature as the wire heats up, reaching equilibrium in about five minutes. Since the compensator is in series with the photocell exterior lamp 82, it will compensate for the retarded response of the system during a warm-up interval of the order of five minutes, and will also level the pulse rate of the counter when the system is in operation in hot sunshine.

The photoconductive cell 81 may be connected between the conductors G and H, in series with a timing condenser or capacitor 93. The circuitry may also include a unijunction transistor 95 having one of its bases connected with the conductor H, preferably through a resistor 97, the other base of the transistor 95 being connected with the base of the transistor 85, through a resistance network comprising a series connected resistance element 99, the opposite ends of which are each connected with the conductor G through a resistance element 101, 103, the emitter of the transistor 95 being connected with the junction of the timing capacitor 93 with the photoconductive cell 81. If desired, the resistor 97 may comprise a thermistor exposed to ambient temperature within the housing 14, in order to automatically adjust the system for changes in temperature.

The following circuit components and parameters have been found effective in the embodiment illustrated in FIG. 7;

Photoconductive cell 81 ___ Type G.E.: A–35.
Unijunction 95 _____ Type G.E.: ZN–1671.
Transistor 85 _____ Type Fairchild: 6001.
Counter C _____ Type G.C.: CE 4 AN5015.
Compensator 90 _____ 50 ohms.
Resistor 91 _____ 200 ohms.
Resistor (or thermistor) 97 _ 330 ohms.
Resistor 99 _____ 1000 ohms.
Resistors 101, 103 _____ 330 ohms.

As the disc 29 moves to progressively apply greater amounts of light to the photoconductive element 81 in response to increase in speed, its resistance becomes correspondingly reduced, thereby permitting the timing capacitor 93 to produce charging and discharging pulses at frequencies which increase with increased speed of vehicle travel through its carrying fluid medium. The capacitor 93 thus regulates the resistance-capacitance time interval required to bring the voltage up to the level required to fire the unijunction transistor 95, the firing rate being thermally stabilized by the thermistor 97, if used. The pulses produced by the firing of the transistor 95 are amplified by the transistor 85, thereby allowing current to flow through the counter actuating solenoid 31, with the aid of the resistor network 101, 103. Pulse frequency is determined by the value of resistance in the element 81, which permits the capacitor 93 to become charged to a voltage level permitting it to discharge through the transistor 95 and into the switching transistor 85, thereby allowing current to flow through the counter actuating solenoid 31. As a consequence, the solenoid will be pulsatingly energized at a rate corresponding with the amount of light permitted to fall upon the photoconductive cell 81 by the plate 29 which in turn corresponds with the speed of the instrument carrying vessel in its supporting medium.

The Bourdon tube apparatus may be provided with a conventional zero setting screw which will be adjusted at the factory.

As shown in FIGS. 3 and 4 of the drawings, the present invention provides an improved mounting for supporting the Pitot tube P on a waterborne vessel V. The blade 35 is preferably formed of a suitable rigid plastic material, such as nylon, and the conduit 16 may comprise artificial rubber or similar flexible hose material. If desired, a short tube 105 may be applied within the blade connected end of the hose and snugly fitted into a seat 107 formed at the upper end of the duct 37, where it joins the socket 41, in order to aid in making fluid tight the connection of the hose 16 with the blade 35. A bracket 108 may be provided for mounting the blade 35 and attached end of the hose 16 adjustably upon the hull of the vessel V, said braket preferably comprising a strap of metal such as stainless steel having a medial portion 109 preferably formed with longitudinal slots 111 and secured in vertically adjustable position on the vessel, as at its rear end, as by means of preferably nickel plated brass fastening members 113 extending in the slots 111, spring means such as a preferably Phosphor bronze lead spring being interposed between the vessel and the bracket to support the same vertically adjusted position on the fastening members 113. The opposite ends of the bracket strap are preferably bent from the medial portion 109 to provide an upper and a lower lug 117 and 119 extending horizontally.

The upper end of the blade 35 may be formed with downwardly inclined top wall surfaces, on opposite sides of its medial longitudinal plane, providing the blade with an inverted V-shaped top. The lower lug 119 has a longitudinal slot 123 opening at its outer end, and downwardly inclined portions 125 on opposite sides of the slot for seating engagement with the inclined surfaces 121 at the top of the blade 35. The outer end of the lug 119 may be turned down, as at 127 to retain the upper end of the blade in seated engagement with the underside of the lug 119.

To resiliently urge and hold the blade 35 against the underside of the lug 119, it may be formed with a threaded enlargement 129 of the upper end of the hose socket 41, for receiving the lower end of a close wound spring 131 which snugly embraces the hose 16 through a distance of several inches from its blade connected end. The slot 123 is sufficiently wide to receive the spring enclosed end of the hose therein, at its junction with the blade. As a consequence, the blade may be seated on the underside of the lug, in front of its downwardly turned rear edge, merely by sliding the blade attached end of the hose enclosing spring into the slot through its open end. The hose enclosing spring extends to an upwardly of the top lug 117, which also is formed with a slot 133 opening at the outer end of the lug. The opposite sides of the slot, however, may be formed as blunt knife edges 135 spaced a distance appreciably less than the coil diameter of the spring. Accordingly, the spring enclosed hose may be secured in the upper lug by pressing the spring into the slot between the knife edges 133, under sufficient spring tension to hold the blade and hose suspended on and between the lugs of the bracket. The outer end of the lug 117 may be tilted upwardly as at 137 to aid in holding the spring on the lug.

It will be seen from the foregoing that the Pitot tube P will be resiliently supported on the vessel V by means of the spring and may deflect to either side, or rearwardly, or forwardly, upon encountering an obstacle. Spring action will draw the blade back to operating position as soon as the blade shall have passed the deflecting obstacle.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. An instrument for measuring speed and distance traveled through a fluid medium comprising a photocell having a variable resistance characteristic responsive to variable incident light quanta, a Pitot tube, a shaft turnable from a datum position in proportion to speed of movement of the Pitot tube in said medium, a light source, a screen on said shaft in position disposed between said light source and said photocell and forming a slot of progressively varying width, whereby said slot area varies continuously and at all times as a proportional function of speed of movement in the medium, a speed indicator on said shaft to show speed in the medium, pulsing means responsive to the output of said photocell for producing pulses at frequency dependent upon the resistance of the photocell, and distance indicating means actuated by said pulses.

2. An instrument, as set forth in claim 1, wherein said pulsing means comprises a condenser and means to charge and discharge the capacitor at frequency rates corresponding with the variable resistance of said cell.

3. An instrument, as set forth in claim 2, including electronic translation means for driving the indicating means at a rate corresponding with the discharge frequency rate of the capacitor.

4. An instrument, as set forth in claim 3, wherein said translation means embodies a transistor controllably connected with and actuated at the discharge frequency rate of the capacitor.

5. An instrument, as set forth in claim 3, wherein said translation means embodies a unijunction transistor, controllably connected with the capacitor, and fireable at the discharge frequency rate thereof, and an electronic amplifier drivingly connected with said distance indicating means and controllably connected with said transistor.

6. An instrument, as set forth in claim 1, including relatively movable index and scale means drivingly connected with said shaft to indicate speed of travel.

7. An instrument, as set forth in claim 1, wherein the distance indicating means comprises an odometer embodying digit wheels.

8. An instrument, as set forth in claim 1, including a Bourdon tube, upon which fluid pressure, developed in the Pilot tube, is applied, the Bourdon tube being drivingly connected with said shaft to turn the same from its datum position.

References Cited

UNITED STATES PATENTS

| | | | |
|---|---|---|---|
| 2,358,571 | 8/1944 | Hall | 250—231 |
| 2,600,828 | 6/1952 | Andersen | 73—183 |
| 3,035,449 | 4/1962 | Hollmann | 73—490 |
| 3,046,792 | 7/1962 | Morgan | 73—490 |
| 3,253,153 | 4/1966 | Stoddard | 230—231 |

LOUIS R. PRINCE, *Primary Examiner.*

DAVID SCHONBERG, *Examiner.*

N. B. SIEGEL, *Assistant Examiner.*

UNITED STATES PATENT OFFICE

CERTIFICATE OF CORRECTION

Patent No. 3,364,739

January 23, 1968

Merrill J. Foster

It is certified that error appears in the above identified patent and that said Letters Patent are hereby corrected as shown below:

Column 2, line 27, "applied" should read -- applies --. Column 5, line 53, "exterior" should read -- excitor --. Column 6, line 36, "photoconductive cell" should read -- photocell --; line 63, after "same" insert -- in --. Column 7, line 16, "an" should read -- and --. Column 8, line 11, "condenser" should read -- capacitor --; line 36, "Pilot" should read -- Pitot --.

Signed and sealed this 6th day of January 1970.

(SEAL)
Attest:

Edward M. Fletcher, Jr.
Attesting Officer

WILLIAM E. SCHUYLER, JR.
Commissioner of Patents